US009569653B1

(12) United States Patent
Suman

(10) Patent No.: US 9,569,653 B1
(45) Date of Patent: Feb. 14, 2017

(54) DARK FIELD ILLUMINATION SYSTEM OBTAINED IN A TILTED PLANE

(71) Applicant: Datalogic IP Tech, S.r.l., Bologna (IT)

(72) Inventor: Michele Suman, Ponte San Nicolò (IT)

(73) Assignee: DATALOGIC IP TECH, S.R.L., Calderara di Reno (IT)

( * ) Notice: Subject to any disclaimer, the term of this patent is extended or adjusted under 35 U.S.C. 154(b) by 0 days.

(21) Appl. No.: 15/181,064

(22) Filed: Jun. 13, 2016

(51) Int. Cl.
*G06K 7/10* (2006.01)
*G06K 7/14* (2006.01)
*G06K 19/06* (2006.01)

(52) U.S. Cl.
CPC ......... *G06K 7/1478* (2013.01); *G06K 7/10732* (2013.01); *G06K 7/1443* (2013.01); *G06K 19/0614* (2013.01)

(58) Field of Classification Search
CPC .. G06K 19/0614; G06K 7/10; G06K 7/10722; G06K 7/10732; G06K 7/10881; G06K 7/12
USPC .................................. 235/454, 472.01–472.03
See application file for complete search history.

(56) References Cited

U.S. PATENT DOCUMENTS

| | | | |
|---|---|---|---|
| 7,264,168 B2 | 9/2007 | He | |
| 7,357,326 B2 * | 4/2008 | Hattersley | G06K 7/10 235/462.45 |
| 7,510,120 B2 | 3/2009 | Reichenbach et al. | |
| 7,571,854 B2 * | 8/2009 | Vinogradov | G06K 7/10722 235/454 |
| 7,614,563 B1 | 11/2009 | Nunnink et al. | |
| 7,874,487 B2 | 1/2011 | Nunnink et al. | |
| 8,061,610 B2 * | 11/2011 | Nunnink | G06K 7/10732 235/454 |
| 9,027,836 B1 | 5/2015 | Lei | |
| 9,082,034 B2 | 7/2015 | Lei et al. | |
| 9,141,833 B2 * | 9/2015 | Gurevich | G06K 7/015 |
| 9,171,194 B2 | 10/2015 | Lei et al. | |
| 2009/0218403 A1 | 9/2009 | Joseph et al. | |
| 2011/0008035 A1 | 1/2011 | Messina et al. | |
| 2012/0211563 A1 * | 8/2012 | Gannon | H04M 1/7253 235/437 |
| 2013/0161393 A1 | 6/2013 | Nunnink | |

* cited by examiner

*Primary Examiner* — Seung Lee
(74) *Attorney, Agent, or Firm* — Seed IP Law Group LLP

(57) ABSTRACT

Systems and methods for providing machine-readable symbol readers that make reading difficult direct part marks simple for a user. A dark field illuminator may generate grazing incidence radiation (e.g., less than 45 degrees, less than 30 degrees, less than 20 degrees) in a plane which is tilted with respect to a plane which is normal to an optical axis of the machine-readable symbol reader. Such configuration provides a reading system which is relatively less affected by unwanted scattering caused by irregularities of a surface marked with a machine-readable symbol. Generally, during use users attempt to scan a machine-readable symbol by positioning the front end of the machine-readable symbol reader "head on" or parallel to the marked surface. By providing a front end which is tilted at an angle other than perpendicular with respect to the optical axis, the user is automatically guided to scan machine-readable symbols at an optimum angle.

24 Claims, 14 Drawing Sheets

DARK FIELD ILLUMINATION SYSTEM OBTAINED IN A TILTED PLANE

BACKGROUND

Technical Field

The present disclosure generally relates to machine-readable symbol readers.

Description of the Related Art

Machine-readable symbols encode information in a form that can be optically read via a machine-readable symbol reader or scanner. Machine-readable symbols take a variety of forms, the most commonly recognized form being the linear or one-dimensional machine-readable symbol. Other forms include two-dimensional machine-readable symbols such as stacked code symbols, area or matrix code symbols, or digital watermarks. These machine-readable symbols may be made of patterns of high and low reflectance areas. For instance, a one-dimensional or barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors or two different reflective property areas, and/or may include more than two colors (e.g., more than black and white). Machine-readable symbols may also include human-readable symbols (e.g., alpha, numeric, punctuation).

Machine-readable symbols are typically composed of elements (e.g., symbol characters) which are selected from a particular machine-readable symbology. Information is encoded in the particular sequence of shapes (e.g., bars, dots) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that a merchant (e.g., via a merchant-employee) can read the machine-readable symbol via a machine-readable symbol reader to allow the customer to redeem a coupon or to verify that the customer has purchased a ticket for the event.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a forklift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Direct part marking (DPM) is a process for imprinting a machine-readable symbol directly on an item or surface in a permanent manner instead of printing the symbol on a paper label that is adhered or attached to a surface. The intent is to create a permanent identifier for the item. In some applications, 2D machine-readable symbols are used in DPM technology. The use of DPM technology is becoming increasingly popular in many applications as manufacturers are required to trace their products from beginning to end throughout the supply chain. This tracking ability needs to endure regardless of the size of the symbol, the surface material involved, or where a component might be shipped to on a global basis. The main benefit of DPM technology is its durability. The permanent nature of the marking assures that the item can be identified throughout its full life cycle and throughout the supply chain, even while being exposed to harsh environmental conditions.

In many cases, machine-readable symbols marked with DPM technology are used to identify and track unique items such as spare parts or components. Another important benefit of DPM technology is that DPM technology allows the marking of very small codes in limited spaces where a standard label cannot be applied. The high variability of the surface material (metal, plastic, glass, etc.) and the reduced size of the symbols marked with DPM offer unique challenges to the device used to read the machine-readable symbols. For DPM technology to be successful in providing traceability and increased operational efficiency, multiple factors need to be considered before choosing DPM technology as the right solution for lifetime product traceability.

DPM technology may be suitable for various industries. While the use of machine-readable symbols marked with DPM technology were first adopted by the automotive sector, the popularity of DPM technology has spread to aerospace, defense, electronics and computers, healthcare, raw materials, jewelry and more. Machine-readable symbols marked with DPM can be implemented on different surfaces and materials including plastic, metal, wood, rubber, leather, glass, etc. The use of 2D symbols provides the capacity to encode a large amount of data in a very limited space. Indeed, manufacturers use DPM technology to enhance the supply chain traceability of car components, medical tools, weapons and defense equipment, fine jewelry, electronic parts or any application where there is the need to experience harsh chemical treatment, endure extreme conditions of moisture or temperature, include high-value assets or items that need to be identified throughout their lifetime.

There are multiple methods for directly marking objects, including laser etching, chemical etching, dot peening, and ink jet printing, for example. Each of these methods has specific advantages and disadvantages in terms of durability, cost and ease of reading.

Laser etching may be the most widely used method because it is applicable to many different materials while offering good marking qualities. This technique does not involve the use of inks, nor does it involve tool bits which contact the engraving surface. However, laser etching affects the material being marked, creating a change of the material characteristics through the interaction with a laser beam. By turning the laser on and off, the laser beam draws or etches the machine-readable symbol on the surface of the material. Depending on the laser strength, the surface changes are affected by ablation, engraving, color change, annealing or surface oxidation.

Chemical etching includes masking to limit the affected area. In some situations, chemical etching may be achieved via multiple manufacturing processes to apply the mask, etch the symbol, and remove the mask.

Dot peening, also known as point of percussion technology, includes a series of mechanical percussions done by a machine and a needle called "peen." Impressions or recesses are made at specific locations modifying the depth of the surface which creates differences in the light reflection and diffusion which is needed to identify light and dark elements of the symbol. This technology is generally considered the most durable solution.

FIG. 1 shows a schematic representation of the various shapes of recesses obtainable by dot peening. In a top row of FIG. 1, three marking pins 10, 12 and 14 for a dot peen system are shown. The middle row of FIG. 1 provides a schematic top plan view of recesses 22, 24 and 26 generated by the marking pins 10, 12 and 14, respectively. The bottom row of FIG. 1 shows a schematic sectional view of the recesses 22, 24 and 26.

The marking pins 10, 12 and 14 include respective cone-shaped tips 16, 18 and 20 which have opening angles of 60 degrees, 90 degrees, and 120 degrees, respectively. As shown in the middle row of FIG. 1, the marking pin 10 generates the recess 22 which has a diameter $D_1$ and a marking depth or height $H_1$, the marking pin 12 generates the recess 24 which has a diameter $D_2$ and a height $H_2$, and the marking pin 14 generates the recess 26 which has a diameter $D_3$ and a height $H_3$. As shown, $D_1$ is less than $D_2$, which is less than $D_3$. Further, $H_1$ is greater than $H_2$, which is greater than $H_3$. Thus, by selecting the particular shape of the marking pin, the diameter and marking depth may be adjusted to be suitable for a particular application.

As shown in the bottom row of FIG. 1, the tip 16 of the marking pin 10 generates the recess 22 and a raised ring or rim 34 surrounding a valley 40. Similarly, the tip 18 of the marking pin 12 generates the recess 24 and a raised ring or rim 36 surrounding a valley 42, and the tip 20 of the marking pin 14 generates the recess 26 and a raised ring or rim 38 surrounding a valley 44.

Ink jet printing includes projecting ink onto the surface of the items, and producing a pattern of spots constituting the symbol by ink deposit. While this process is not suitable for harsh environments, the advantage of this technology is that it can be used on all types of surfaces and eliminates the need for a paper label.

Yet, the use of imaging readers, especially handheld readers, for reading DPM codes on workpieces has proven to be challenging. Contrast is still often less than desirable. Ambient lighting conditions are variable. Illumination from on-board illuminators or illumination light sources is directed at variable angles. Reflections from ambient light sources and illumination light sources often appear in the field of view of the reader as hot spots, glare, or specular reflections of intense, bright light that saturate the imagers, thereby degrading reading performance.

In addition, aiming the handheld imaging readers at the DPM codes, prior to reading the DPM codes, has proven to be difficult. Requiring an operator to aim the reader at the DPM codes makes the process of locating and decoding the DPM codes faster and easier. Unlike machine-readable codes printed in one color (for example, black) on paper of another color (for example, white), DPM codes are typically difficult for a human operator to even find on the workpieces, which often have complicated, e.g., non-planar, curved, reflective surfaces, to further complicate finding the DPM codes and aiming the reader directly at the DPM codes for reading.

BRIEF SUMMARY

A machine-readable symbol reader may be summarized as including: a housing which includes a scanning head portion including a front surface, the front surface includes a top portion, a bottom portion opposite the top portion, a first lateral portion which extends between the top portion and the bottom portion, and a second lateral portion opposite the first lateral portion which extends between the top portion and the bottom portion; a receiving subsystem disposed within the housing which captures an image of a machine-readable symbol within a field of view of the receiving subsystem, the field of view directed along an optical axis; and an illumination system which illuminates the machine-readable symbol while the receiving subsystem captures the image thereof, the illumination system comprising: a dark field illumination subsystem which in operation provides dark field illumination; and a diffuse field illumination subsystem which in operation provides diffuse field illumination; wherein at least a portion of the front surface of the scanning head portion of the housing is slanted forward at a tilt angle with respect to a plane which is normal to the optical axis, the tilt angle equal to or greater than 15 degrees and less than or equal to 30 degrees.

The front surface of the scanning head portion of the housing may be bounded toward the front of the machine-readable symbol reader by a bounding plane which is parallel to the tilt angle. The tilt angle may be equal to or greater than 20 degrees and less than or equal to 25 degrees. The dark field illumination subsystem may provide dark field illumination at one or more grazing angles with respect to a plane which is parallel to the tilt angle, each of the one or more grazing angles is less than or equal to 30 degrees with respect to the plane which is parallel to the tilt angle. The dark field illumination subsystem may provide dark field illumination at one or more grazing angles with respect to a plane which is parallel to the tilt angle, each of the one or more grazing angles is less than or equal to 20 degrees with respect to the plane which is parallel to the tilt angle. The dark field illumination subsystem may provide dark field illumination at one or more grazing angles with respect to a plane which is parallel to the tilt angle, each of the one or more grazing angles is equal to or greater than 15 degrees and less than or equal to 20 degrees with respect to the plane which is parallel to the tilt angle. The dark field illumination subsystem may include a top row of light sources and a bottom row of light sources. Each of the top row and the bottom row of light sources may be disposed in a plane which is parallel to the tilt angle. Each of the top row and the bottom row of light sources may have an arc-shaped profile. Each of the first lateral portion and the second lateral portion may include a notched portion which is disposed rearward of the at least a portion of the front surface of the scanning head portion of the housing that is slanted forward at the tilt angle. The notched portion may include at least one portion which is normal to the optical axis. The notched portion may provide a line of sight to a marked surface when the marked surface is disposed adjacent the front surface of the scanning head portion of the machine-readable symbol reader.

A method of operating a machine-readable symbol reader may be summarized as including: providing a machine-readable symbol reader which includes a housing having a scanning head portion including a front surface and a receiving subsystem disposed within the housing which has a field of view associated therewith which is directed along an optical axis, wherein at least a portion of the front surface of the scanning head portion of the housing is slanted forward at a tilt angle with respect to a plane which is normal to the optical axis, the tilt angle equal to or greater than 15 degrees and less than or equal to 30 degrees; positioning the front surface of the scanning head portion proximate a surface marked with a machine-readable symbol such that the marked surface is oriented parallel to the at least a portion of the front surface which is slanted forward at the tilt angle; illuminating, via at least one illumination subsystem, the surface marked with the machine-readable symbol; and capturing, via the receiving subsystem, an image of the surface marked with the machine-readable symbol.

Providing a machine-readable symbol reader may include providing a machine-readable symbol reader which includes a front surface of the scanning head portion of the housing that is bounded toward the front of the machine-readable symbol reader by a bounding plane which is parallel to the tilt angle. Providing a machine-readable symbol reader may include providing a machine-readable symbol reader, and the tilt angle may be equal to or greater than 20 degrees and less than or equal to 25 degrees. Illuminating the surface marked with the machine-readable symbol may include illuminating the surface at one or more grazing angles with respect to a plane which is parallel to the tilt angle, each of the one or more grazing angles is less than or equal to 30 degrees with respect to the plane which is parallel to the tilt angle. Illuminating the surface marked with the machine-readable symbol may include illuminating the surface at one or more grazing angles with respect to a plane which is parallel to the tilt angle, each of the one or more grazing angles is less than or equal to 20 degrees with respect to the plane which is parallel to the tilt angle. Illuminating the surface marked with the machine-readable symbol may include illuminating the surface at one or more grazing angles with respect to a plane which is parallel to the tilt angle, each of the one or more grazing angles is equal to or greater than 15 degrees and less than or equal to 20 degrees with respect to the plane which is parallel to the tilt angle. Illuminating the surface marked with the machine-readable symbol may include illuminating the surface utilizing a top row of light sources and a bottom row of light sources. Illuminating the surface marked with the machine-readable symbol may include illuminating the surface utilizing a top row of light sources and a bottom row of light sources, and each of the top row and the bottom row of light sources is disposed in a plane which is parallel to the tilt angle. Illuminating the surface marked with the machine-readable symbol may include illuminating the surface utilizing a top row of light sources and a bottom row of light sources, and each of the top row and the bottom row of light sources has an arc-shaped profile. Providing a machine-readable symbol reader may include providing a machine-readable symbol reader wherein the front surface of the scanning head portion may include a notched portion which is disposed rearward of the at least a portion of the front surface of the scanning head portion of the housing that is slanted forward at the tilt angle. Providing a machine-readable symbol reader may include providing a machine-readable symbol reader wherein the notched portion may include at least one portion which is normal to the optical axis. Providing a machine-readable symbol reader may include providing a machine-readable symbol reader wherein the notched portion may provide a line of sight to a marked surface when the marked surface is disposed adjacent the front surface of the scanning head portion of the machine-readable symbol reader.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
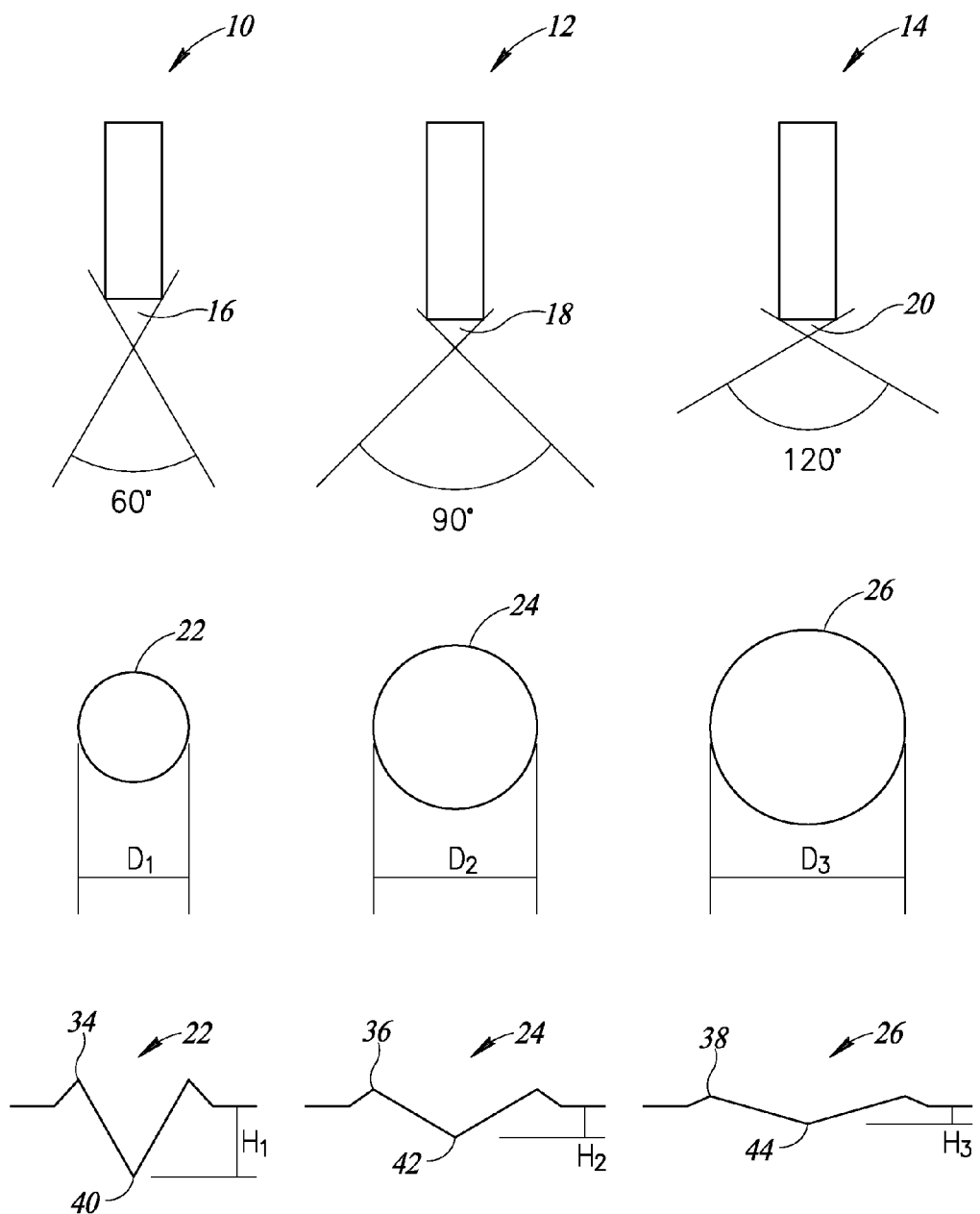
FIG. 1 is a schematic diagram showing three marking pins for use in a dot peening process which generate corresponding recesses in an object.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to handheld machine-readable symbol readers which make reading even the most difficult direct part marks simple for a user. Such may be accomplished by providing a dark field illuminator which generates grazing incidence radiation (e.g., less than 45 degrees, less than 30 degrees, less than 20 degrees) in a plane which is tilted with respect to a plane which is normal to an optical axis of the machine-readable symbol reader. This configuration provides a reading system which is relatively less affected by unwanted scattering caused by irregularities of a surface marked with a machine-readable symbol. Generally, users attempt to scan a machine-readable symbol by positioning the front end of the machine-readable symbol reader "head on" or parallel to the marked surface. As discussed further below, by providing a front end which is tilted at an angle other than perpendicular with respect to the optical axis, the user is automatically guided to scan machine-readable symbols at an optimum angle.

According to some implementations, upon activating a trigger of a machine-readable symbol reader, the machine-readable symbol reader runs through a number of illumination sequences to execute a read cycle. The machine-readable symbol reader may capture several images with each of a plurality of illumination zones. In cases where a user reads the same part or same part type sequentially, the machine-readable symbol reader may use the most recent good read settings as a starting point so subsequent reads will be faster. Advantageously, the machine-readable symbol readers discussed herein may be held by a user during operation such that a front surface of the machine-readable symbol reader is parallel to the marked surface. Thus, unlike other machine-readable symbol readers which require a tilt to read, the machine-readable symbol readers are designed to allow the user to orient the front surface of the reader parallel to the mark surface, which provides a more intuitive operation for the user.

In some implementations, the machine-readable symbol readers may ensure reliable decoding of direct part marks by utilizing an advanced combination of low angle ("dark field") and dome (diffuse field) illumination techniques. Such features enable the machine-readable symbol readers discussed herein to provide even illumination of flat, shiny surfaces, enhancing embossed features, or differentiating features on curved surfaces.

The low angle illumination zone of the machine-readable symbol readers discussed herein provides what is called "dark field" illumination, ideal for very low-contrast marks such as laser-embossed or engraved marks. The low angle illumination zone may be useful on both specular and non-specular surfaces and emphasizes surface texture. This illumination zone actually directs light inward at an angle, which varies with the actual working distance and provides a good source of low angle illumination from contact to a relatively short working distance (e.g., 3 cm). In some implementations, beyond this working distance for low angle illumination, the illumination zone converts to a general-purpose illuminator due to a portion of the illumination-passing straight through a prism. This can be useful in providing "bright field" illumination. This zone may be operative to read relatively larger marks such as 1D symbols at longer working distances.

Dome illumination provides diffused, uniform light. The relatively large, solid angle of illumination supports imaging of shiny flat surfaces or curved surfaces. This zone may be useful on specular and non-specular surfaces, ideal for deemphasizing surface texture and elevation (curves). The dome provides the widest area of coverage at close working distances. In addition to illuminating marks on curved surfaces, dome illumination also provides diffuse, even bright field illumination, which will provide thorough coverage on a wide variety of direct part marks.

In some implementations, the machine-readable symbol readers disclosed herein provide broad reading capabilities by combining the illumination system with advanced decode algorithms. For example, the machine-readable symbol readers of the present disclosure may automatically cycle through a default combination of the illumination zones each time the user pulls the trigger to decode a mark. The machine-readable symbol reader may then lock onto the settings used in the last good read and move those to the first step in the next sequence.

Figure 2:
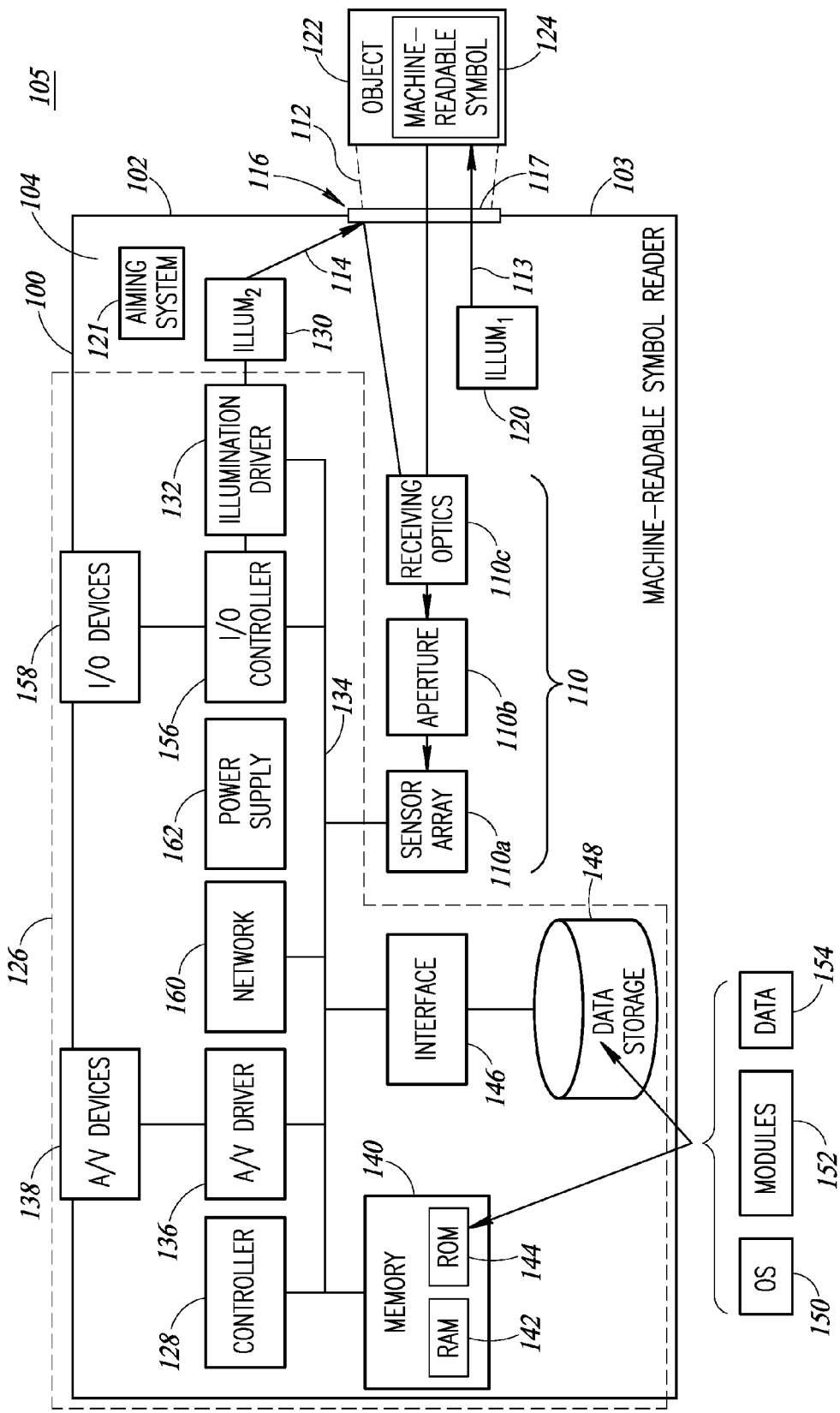
FIG. 2 is a block diagram of a machine-readable symbol reader and an object bearing a machine-readable symbol to be read, according to one illustrated implementation.

FIG. 2 shows a machine-readable symbol reader 100, according to one implementation. The machine-readable symbol reader 100 includes an imager 110 which includes an image sensor or sensor array 110a, receiving optics 110c and optionally an adjustable aperture 110b. The imager 110 can capture images of one or more fields of view such as field of view 112 (broken lines) through a window 116 in a barrier 102, which barrier 102 may form a portion of a housing 103. The imager 110 is located on an inner side 104 of the barrier 102, e.g., in the interior of the housing 103. Image frames captured by the sensor array 110a may include light emanating from outside the barrier 102, e.g., exterior 105 to the housing 103, in the field of view 112.

The window 116 includes one or more optics 117 which are transparent or at least translucent. For example, the optics 117 can include one or more transparent substrates, such as transparent plastic and/or transparent glass substrates. FIG. 2 also illustrates an item or object 122 positioned outside the barrier, e.g., exterior to the housing, within the field of view 112. The object 122 includes a machine-readable symbol 124 that is to be detected and/or decoded by the machine-readable symbol reader 100. The machine-readable symbol 124 may be a DPM on the object 122 generated by a suitable DPM process (e.g., dot peening).

The machine-readable symbol reader 100 includes at least one diffuse field illumination source 120, which is operable to illuminate one or more fields of view 112. The diffuse field illumination source 120 can comprise any suitable source of light, such as one or more light emitting diodes (LEDs), flash strobes, incandescent or fluorescent lamps, or halogen bulbs. The diffuse field illumination source 120 may generate light having one or more wavelengths. The diffuse field illumination source 120 is positioned on the inner side 104 of the barrier 102, e.g., in the interior of the housing 103, and oriented to primarily pass light (arrow 113) through the window 116 via the at least one optic 117 without directly passing light to the imager 110 and substantially without reflection to the imager 110 from the at least one optic 117 of the window 116.

The machine-readable symbol reader 100 includes at least one dark field illumination source 130, which is operable to produce light 114 which exits the window 116 at grazing incidence angles (e.g., less than 45 degrees, less than 30 degrees, less than 20 degrees). The dark field illumination source 130 can comprise any suitable source of light, preferably one or more light emitting diodes (LEDs), or alternatively one or more incandescent or fluorescent lamps, or halogen bulbs. The dark field illumination source 130 may generate light having one or more wavelengths. The dark field illumination source 130 is positioned on the inner side 104 of the barrier 102, e.g., in the interior of the housing 103.

The machine-readable symbol reader 100 may also include an aiming subsystem 121, for example, positioned on a front wall of a scanning head portion of the reader. As an example, the aiming subsystem 121 may project an illumination pattern onto the target object 122 which allows the user to aim the machine-readable symbol reader toward the object. The illumination pattern may be any suitable pattern, such as one or more lines, one or more dots, one or more polygons, etc.

The sensor array 110a forms an electronic image of the one or more fields of view 112. The sensor array 110a may comprise a wide range of image sensing devices for converting an optical image (or another wavelength in the electromagnetic spectrum) into an electrical signal. For example, the sensor array 110a may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the sensor array 110a has been exposed to light emanating from field of view, data from all the pixels can be sequentially read out in a selectable pattern (which may be row-by-row, sub-region by sub-region, or some other pattern). The pixel intensity data may optionally be converted to digital form using an analog-to-digital converter.

The machine-readable symbol reader 100 includes a control subsystem (enclosed by broken line polygon) 126 that controls operation of the various components of the machine-readable symbol reader 100, for example controlling operation of the imager 110, the diffuse field illumination source 120 and dark field illumination source 130, for instance as described herein. The control subsystem 126 can, for example, include one or more of: a controller 128, illumination drivers or controllers 132, one or more non-transitory media, and other components, for instance as discussed herein.

In response to receiving an instruction from a controller 128, the sensor array 110a captures or acquires one or more images of the one or more fields of view 112. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read.

One or more illumination drivers or controllers 132 are provided. The illumination driver 132 is communicatively coupled and operable to apply signals to drive the diffuse field illumination source 120 to activate the diffuse field illumination source 120 at desired times. The illumination driver 132 may also be communicatively coupled and operable to apply signals to drive the dark field illumination source 130 to activate the dark field illumination source 130 at desired times.

The sensor array 110a and the illumination driver 132 are communicatively coupled to the controller 128, which may be, for example, one or more of a processor, microprocessor, controller, microcontroller, digital signal processor (DSP), graphical processing unit (GPU) or the like (generally "processor"). Some implementations may include a dedicated machine-readable symbol scan engine or module as the controller 128. The communicative coupling may be via a bus 134 or other communication mechanism, such as direct connections of a serial, parallel, or other type. The controller 128 generally controls and coordinates the operation of other devices to which it is connected, such as one or more of the imager 110 (e.g., sensor array 110a, adjustable aperture 110b), the illumination driver 132, the diffuse field illumination source(s) 120, and the dark field illumination source(s) 130.

The controller 128 generally controls and coordinates the operation of an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to at least one implementation, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions to implement the methods for generating image data using the data reader 100. The data 154 may include one or more configuration settings or parameters, or may include image data from the sensor array 110a and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a keyboard, a pointing device, or other wired/wireless input devices, that allow the user to, for example, configure the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

The network interface 160 may optionally be provided to communicate with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™ IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. For example, the machine-readable symbol reader 100 may comprise a fixed scanner, such as an on-counter scanner or in-counter scanner, or a portable scanner, such as a handheld scanner. In addition, the machine-readable symbol reader 100 may include a radiofrequency identification (RFID) reader or interrogator and/or or a magnetic stripe reader. Such may be particularly useful when employed as a point-of-sale (POS) terminal.

After the sensor array 110a has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110a.

Figure 3A:
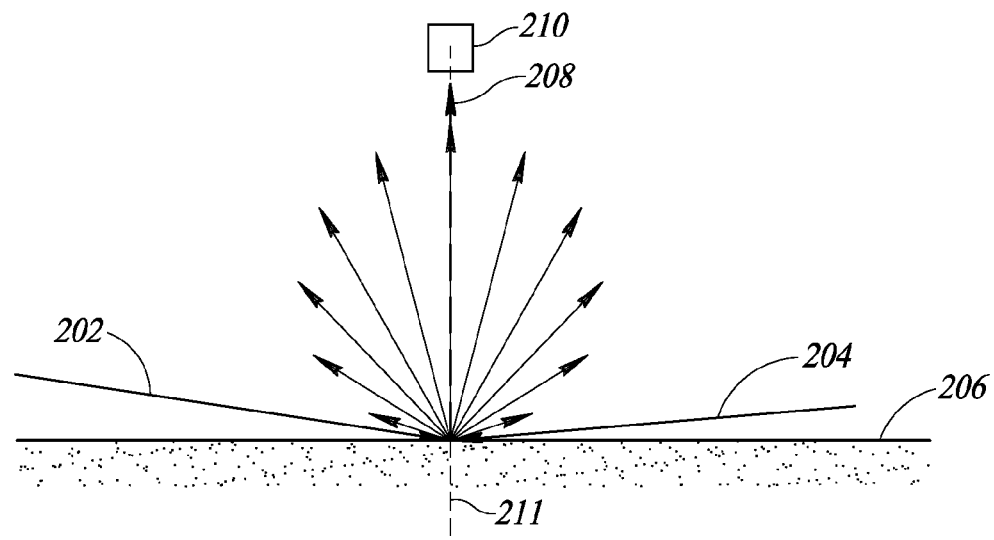
FIG. 3A is an elevational view of a dark field illumination subsystem of a machine-readable symbol reader illuminating a surface showing a primary propagation of reflected light which is normal to the surface, according to one illustrated implementation.

FIG. 3A shows light 202 and 204 emitted from a dark field illumination subsystem of a machine-readable symbol reader at grazing angles (e.g., less than 45 degrees) which illuminates a rough surface 206 which is normal to an optical axis 211 of a receiving subsystem 210 of the machine-readable symbol reader. As shown, a primary propagation of scattered light 208 is normal to the surface 206, which causes the reflected light to be directed toward the receiving subsystem 210 of the machine-readable symbol reader even though no mark (e.g., dot peen) is present.

Figure 3B:
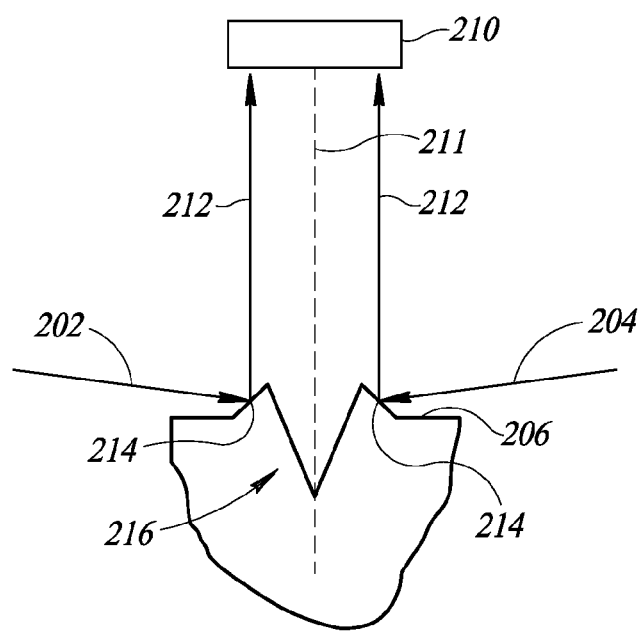
FIG. 3B is an elevational view of a dark field illumination subsystem of a machine-readable symbol reader illuminating a recess generated by a dot peen process, according to one illustrated implementation.

FIG. 3B shows the light 202 and 204 emitted from the dark field illumination subsystem of the machine-readable symbol reader which illuminates a recess 216 generated by a dot peen process. Similar to FIG. 3A, the surface 206 is normal to the optical axis 211 of the receiving subsystem 210. As shown, the light 202 and 204 is reflected by the raised rim 214 of the recess 216 and the reflected light 212 is directed toward the receiving subsystem 210 for detection thereby.

Figure 4A:
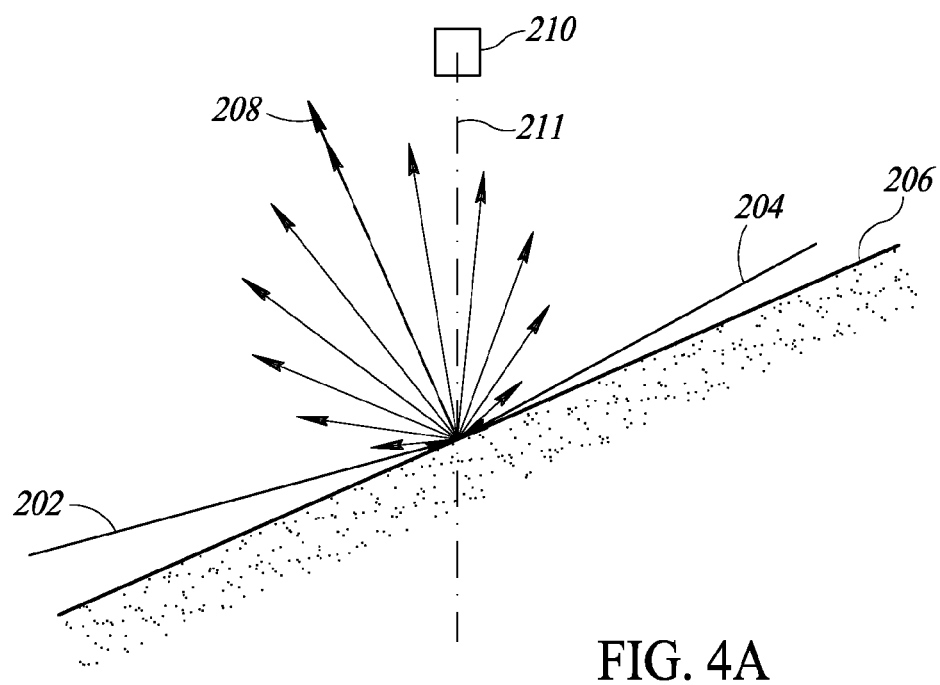
FIG. 4A is an elevational view of a dark field illumination subsystem of a machine-readable symbol reader illuminating a surface at a tilted angle, showing a primary propagation of reflected light which is normal to the surface that is not reflected toward a receiving subsystem of the machine-readable symbol reader, according to one illustrated implementation.

FIG. 4A shows light 202 and 204 emitted from a dark field illumination subsystem of a machine-readable symbol reader at grazing angles (e.g., less than 45 degrees) which illuminates the surface 206 which is tilted relative to a plane which is normal to an optical axis 211 of a receiving subsystem 210 of the machine-readable symbol reader. As shown, a primary propagation of scattered light 208 is normal to the surface 206, which causes the reflected light to be directed away the receiving subsystem 210 of the machine-readable symbol reader. Thus, the receiving subsystem 210 does not receive the main propagation of the reflected light 208 from the surface 206 where no recess of a machine-readable symbol is present.

Figure 4B:
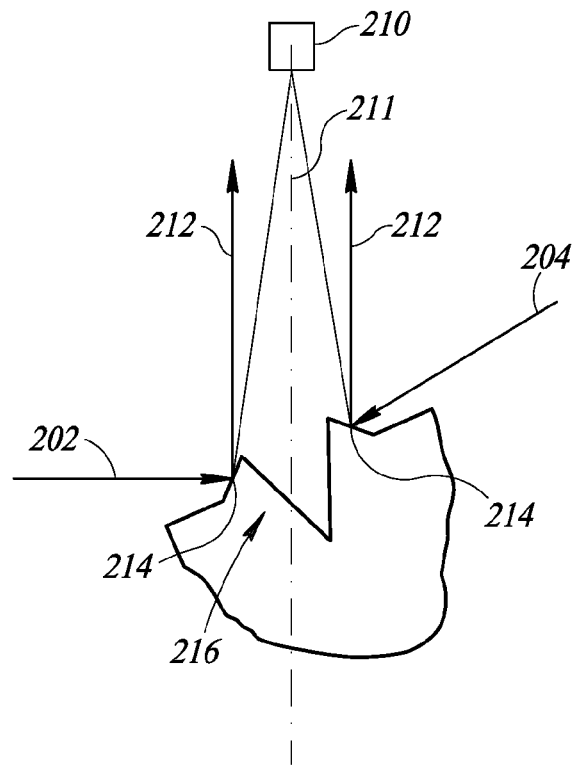
FIG. 4B is an elevational view of a dark field illumination subsystem of a machine-readable symbol reader illuminating a recess generated by a dot peen process at a tilted angle, according to one illustrated implementation.

FIG. 4B shows the light 202 and 204 emitted from the dark field illumination subsystem of the machine-readable symbol reader which illuminates a recess 216 generated by a dot peen process. Similar to FIG. 4A, the surface 206 is tilted relative to a plane which is normal to the optical axis 211 of the receiving subsystem 210. As shown, the light 202 and 204 is reflected by the raised rim 214 of the recess 216 and the reflected light 212 is directed toward the receiving subsystem 210 for detection thereby. Thus, as illustrated in FIGS. 4A and 4B, the light scattered from the surface 206 is substantially different from the light scattered from the recess 216 which advantageously provides improved detection capabilities.

Figure 5:
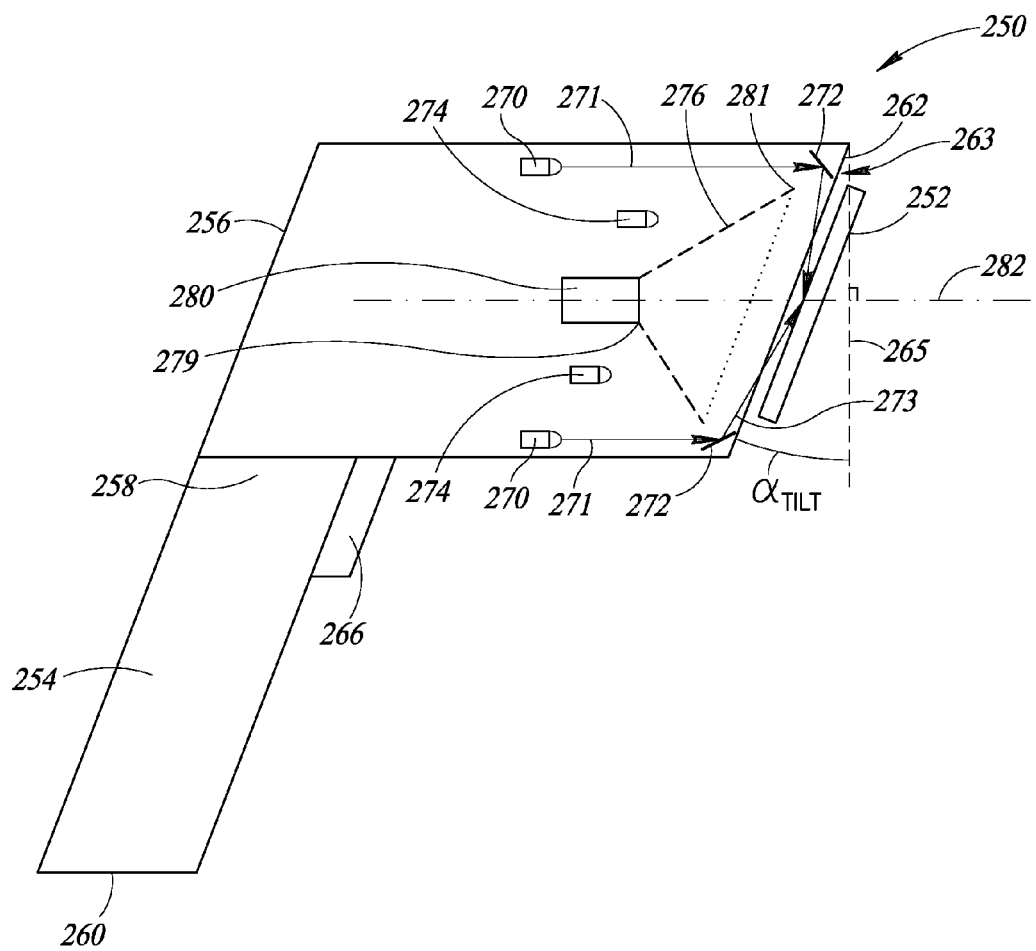
FIG. 5 is a schematic sectional view of a machine-readable symbol reader when operating in a dark field illumination mode, according to one illustrated implementation.
Figure 6:
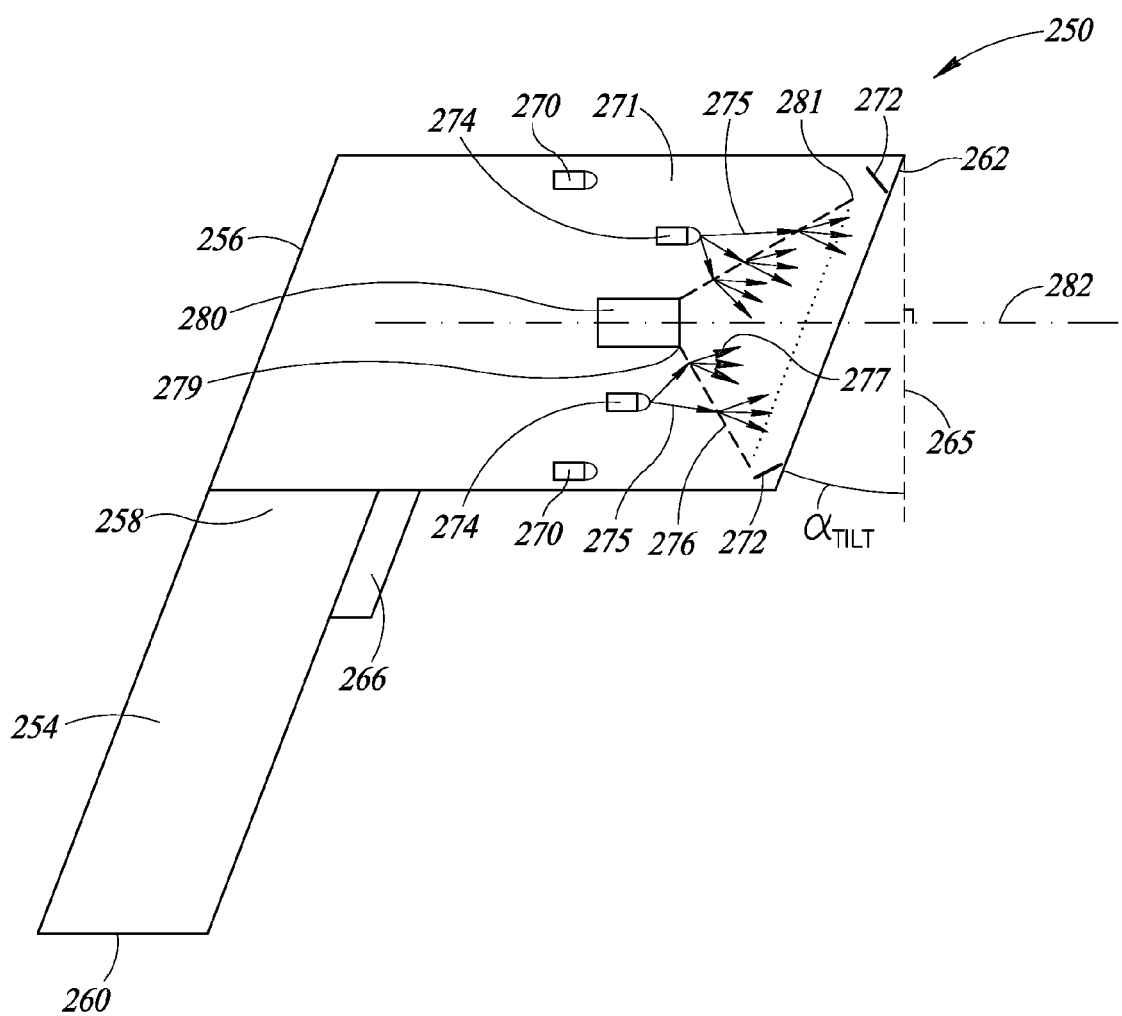
FIG. 6 is a schematic sectional view of a machine-readable symbol reader when operating in a diffuse illumination mode, according to one illustrated implementation.

FIGS. 5 and 6 show a handheld machine-readable symbol reader or scanner 250 acting upon a target object 252 labeled with a machine-readable symbol (e.g., barcode symbol). FIG. 5 shows the machine-readable symbol reader 250 when operating in a dark field illumination mode and FIG. 6 shows the machine-readable symbol reader when operating in a diffuse field illumination mode. In practices, the machine-readable symbol reader may operate in one or more additional modes (e.g., bright field illumination mode) and may include suitable illumination subsystems for implementing such additional modes.

The reader or scanner 250 may be an imaging based machine-readable symbol reader. The handheld machine-readable symbol reader 250 includes a housing which includes a gripping portion 254 shaped and sized to be grasped by an operator's hand and a scanning head portion 256 extending from an upper portion 258 of the gripping portion. A lower portion 260 of the gripping portion 254 may be shaped and sized to be received in a docking station (not shown). The machine-readable symbol reader 250 includes a front wall region or surface 262 on the scanning head portion 256. The scanning head portion 256 also includes a transparent window 263 present behind the front wall 262 behind which is positioned an image formation subsystem, as discussed below. As shown, the front wall region 262 is tilted at a tilt angle $\alpha_{TILT}$ with respect to a plane 265 that is normal to the optical axis 282. The tilt angle may be between 15 and 30 degrees, for example. More generally, the front surface 262 of the scanning head portion 256 of the housing may be bounded toward the front of the machine-readable symbol reader 250 by a bounding plane which is slanted forward at the tilt angle with respect to the plane 265. As discussed above, such tilt angle guides the operator to tilt the scanning head portion 256 so that the front wall 262 is positioned "head on" or parallel with the object 252 which provides the optimum orientation between the object and the receiving subsystem 280.

The machine-readable symbol reader 250 may be used in at least one of a handheld mode or a fixed position mode. In the fixed position mode, the reader 250 may be received in a docking station and a target object 252 having a machine-readable symbol thereon may be brought within the field of view (FOV) of the machine-readable symbol reader to have the reader 250 read or detect the machine-readable symbol. In the handheld mode, the reader 250 may be carried by an operator and positioned such that the surface of the target object 252 carrying the machine-readable symbol is within the field of view (FOV) of the reader. In the handheld mode, imaging and decoding of the target machine-readable symbol may be initiated by the operator depressing a trigger 266, for example.

For the purpose of this description, a handheld imaging based machine-readable symbol reader is discussed. However, it will be apparent to one of ordinary skill in the art that the techniques and devices described herein can be practiced advantageously with stationary, bi-optic, or other types of readers or scanners.

As shown in FIG. 5, the scanning head portion 256 of the machine-readable symbol reader 250 includes a receiving subsystem 280, a dark field illumination subsystem comprising light sources 270 and reflectors 272, and a diffuse field illumination subsystem comprising light sources 274 and a diffuser 276. In operation, the machine-readable symbol reader 250 illuminates the object 252 using the dark field illumination subsystem and/or the diffuse field illumination subsystem and captures an image of the object using the receiving subsystem 280.

The receiving subsystem 280 is disposed within the scanning head portion 256 and captures an image of a machine-readable symbol within a field of view of the receiving subsystem. The field of view is directed along the optical axis 282 of the receiving subsystem 280. The receiving subsystem 282 may include a sensor array and a lens which focuses light reflected from the object 252 onto the array, as discussed above.

Figure 10:
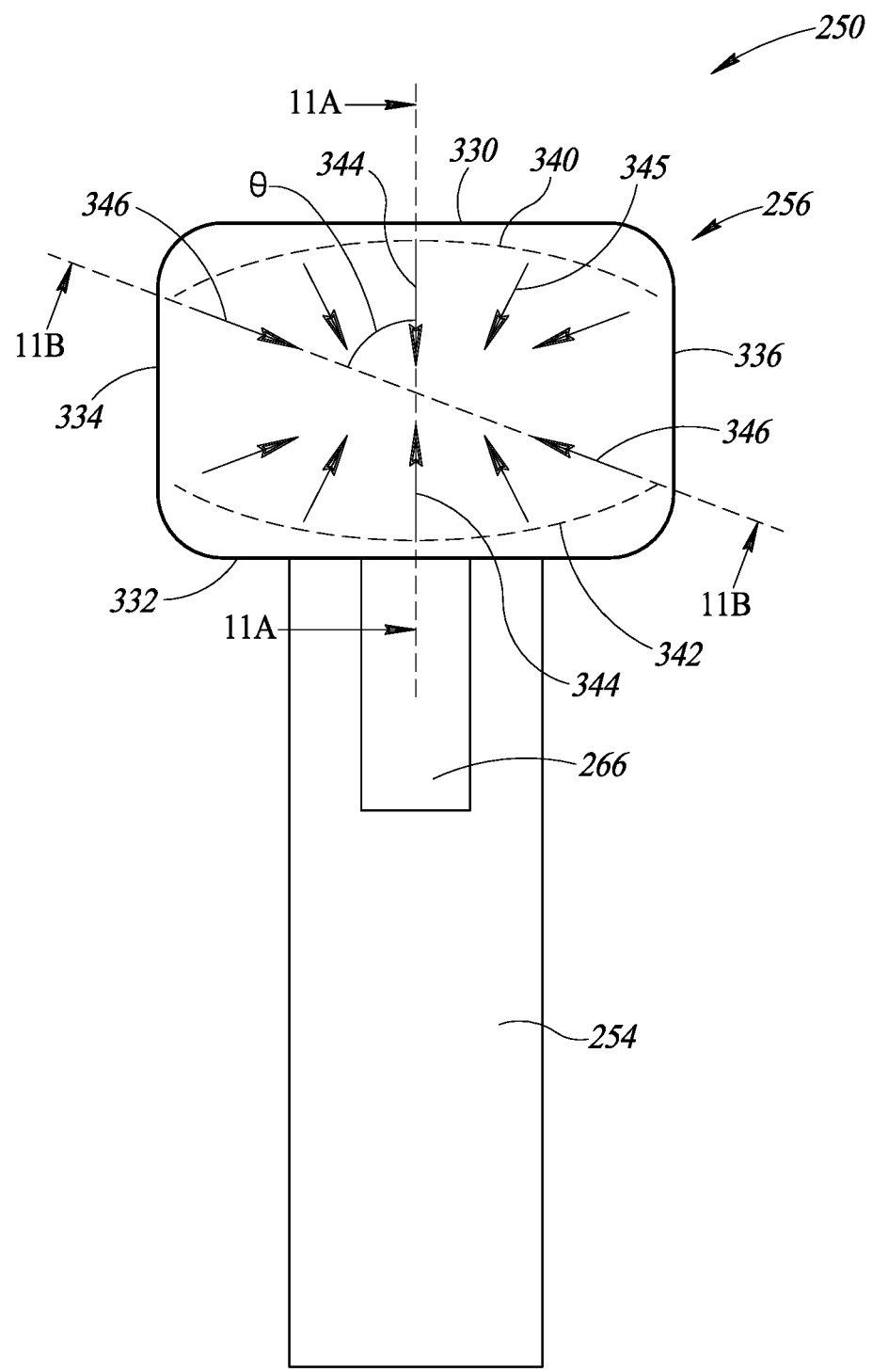
FIG. 10 is a schematic front elevational view of the machine-readable symbol reader of FIGS. 5 and 6 showing a dark field illumination subsystem which includes a top arc-shaped row of light sources and a bottom arc-shaped row of light sources, according to one illustrated implementation.

Light 271 emitted from the light sources 270 of the dark field illumination subsystem may be reflected (as indicated by arrow 273) or guided by reflectors 272 towards the object 252 at a grazing angle with respect to the front surface 262 of the scanning head portion. The grazing angle may be less than 45 degrees (e.g., 15 degrees, 18 degrees, 30 degrees). Although only two light sources 270 are shown for clarity, in practice the dark field illumination subsystem may include several light sources 270 to provide more uniform illumination. For example, as shown in FIG. 10, the dark field illumination subsystem may include a number of light sources arranged in an upper row (e.g., arc-shaped row) and a number of light sources arranged in a lower row (e.g., arc-shaped row). In other implementations, the number and positioning of the light sources of the dark field illumination subsystem may be different (e.g., a ring of light sources). Further, additional optics may also be associated with the dark field illumination subsystem to direct illumination toward the object 252 at grazing angles. The additional optics may utilize refraction, diffusion, internal reflection, prismatic effect, etc., to direct illumination toward the object 252.

As shown in FIG. 6, the diffuse field illumination subsystem includes a plurality of light sources 274 (two shown) which are oriented to emit light 275 toward a tapered or "conical" diffuser 276, which emits diffuse light 277 in a direction which extends toward the optical axis 282 of the machine-readable symbol reader 250, such that an object in front of the machine-readable symbol reader is illuminated by the diffuse light. The diffuser 276 may include a narrow opening 279 proximate the receiving subsystem 280 and a larger opening 281 located at an opposite end toward the front of the scanning head portion 256. As an example, the diffuser 276 may be constructed from a thin polymer material with a frosted/textured interior. The light sources 274 may emit any suitable color of light (e.g., red, blue, white).

Thus, to summarize, the machine-readable symbol reader 250 includes at least two sets of illumination subsystems, a dark field illumination subsystem and a diffuse field illumination subsystem. As noted above, the machine-readable symbol reader 250 may include additional illuminations subsystems (e.g., a bright field illumination subsystem) which are not shown for the sake of clarity.

Figure 7A:
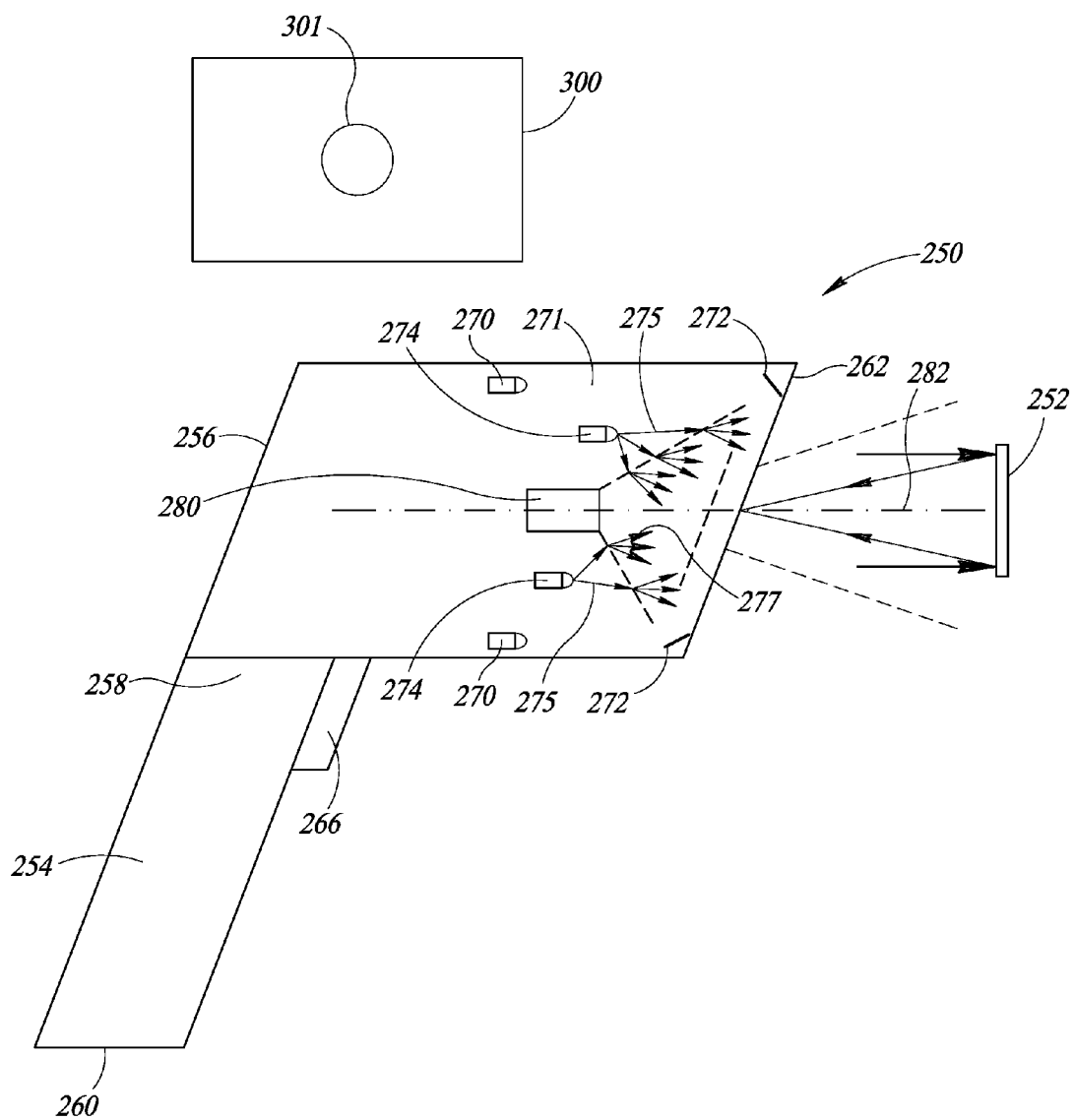
FIG. 7A is a schematic sectional view of a machine-readable symbol reader showing a dark zone which results when an object surface is scanned when the object surface is normal to the optical axis of the machine-readable symbol reader, according to one illustrated implementation.
Figure 7B:
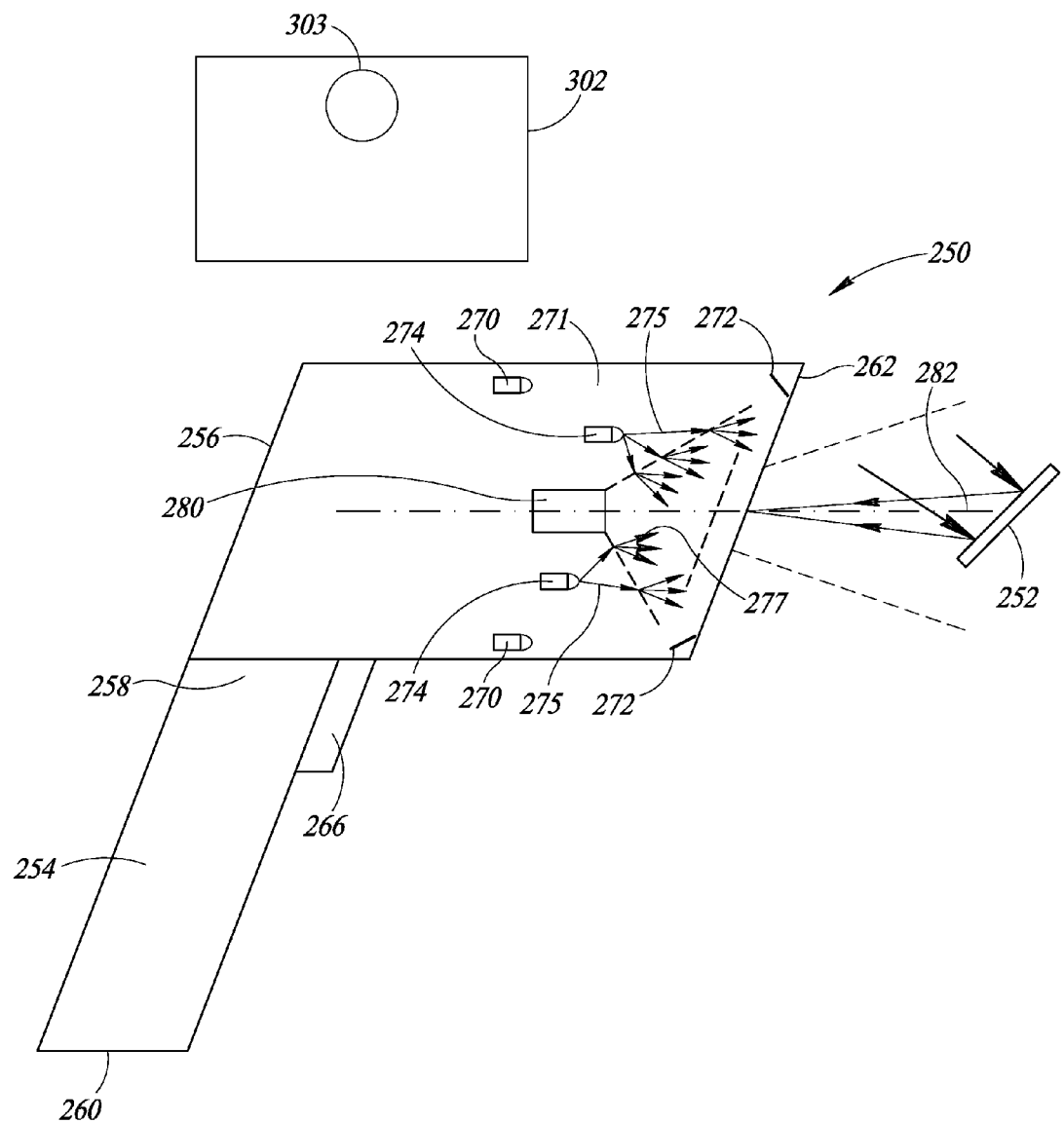
FIG. 7B is a schematic sectional view of a machine-readable symbol reader showing a dark zone which results when an object surface is scanned when the object surface is tilted with respect to a plane which is normal the optical axis of the machine-readable symbol reader, according to one illustrated implementation.

FIGS. 7A and 7B show images 300 and 302, respectively, of the receiving system 280 when capturing an image of a specular object 252 when the object is oriented normal to the optical axis 282 (FIG. 7A) and when the object is tilted with respect to a plane 265 which is normal to the optical axis (FIG. 7B). As shown in FIG. 7A, when the object 252 is oriented normal to the optical axis 282, a dark zone 301 caused by receiving optic shadow projection to the surface of the object is positioned in the center of the image 300, which may reduce the decoding capabilities of the machine-readable symbol reader 250. As shown in FIG. 7B, when the object 252 is tilted relative to a plane which is normal to the optical axis 282, a dark zone 303 caused by receiving optic shadow projection to the surface of the object is positioned at a marginal location of the image 304 where the dark zone is less likely to inhibit decoding capabilities compared to the dark zone 301, which is positioned in the center of the image 300. Thus, capturing an image of a specular object when the object is tilted relative to a plane 265 which is normal the optical axis 282 is advantageous.

Figure 8:
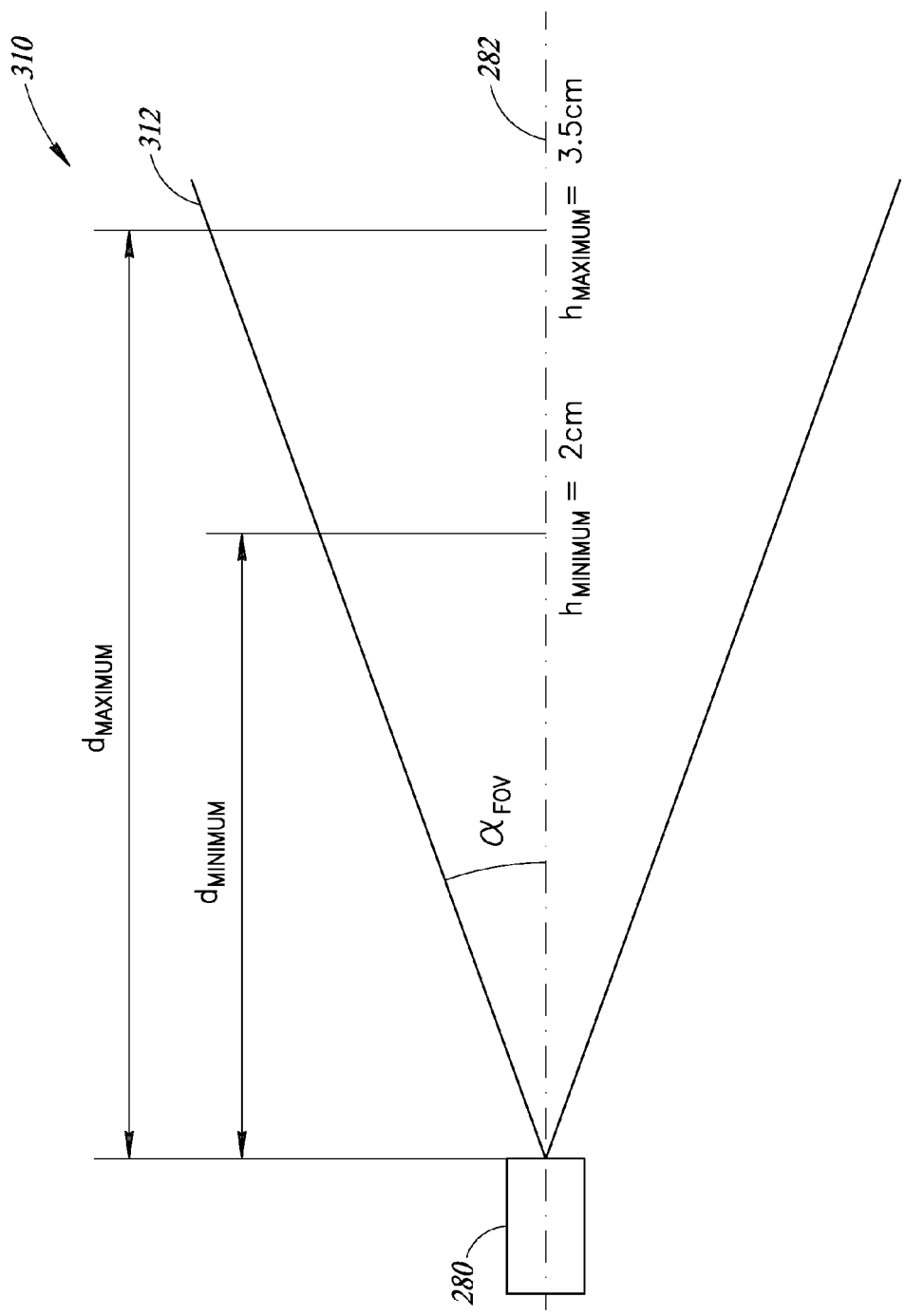
FIG. 8 is a schematic diagram of a receiving subsystem for a machine-readable symbol reader which shows dark field distance estimation, according to one illustrated implementation.

FIG. 8 is a schematic diagram 310 of a receiving subsystem 280 for a machine-readable symbol reader which shows dark field illumination distance estimation, according to one illustrated implementation. The parameters shown in FIG. 8 include an angular field of view ($\alpha_{FOV}$) of the reader, as indicated by line 312, framing heights range ($h_{MINIMUM}$, $h_{MAXIMUM}$) in dark field conditions, and minimum and maximum dark field distances ($d_{MINIMUM}$, $d_{MAXIMUM}$), respectively. In the example shown, the minimum height ($h_{MINIMUM}$) is equal to 2 centimeters and the maximum height ($h_{MAXIMUM}$) is equal to 3.5 centimeters, but other values may be used dependent on the particular application.

The range of dark field distances ($d_{MINIMUM}$, $d_{MAXIMUM}$) may be calculated by formulas (1) and (2) below:

$$d_{MINIMUM} = \frac{h_{MINIMUM}}{\tan(\alpha_{FOV})} \quad (1)$$

$$d_{MAXIMUM} = \frac{h_{MAXIMUM}}{\tan(\alpha_{FOV})} \quad (2)$$

Figure 9:
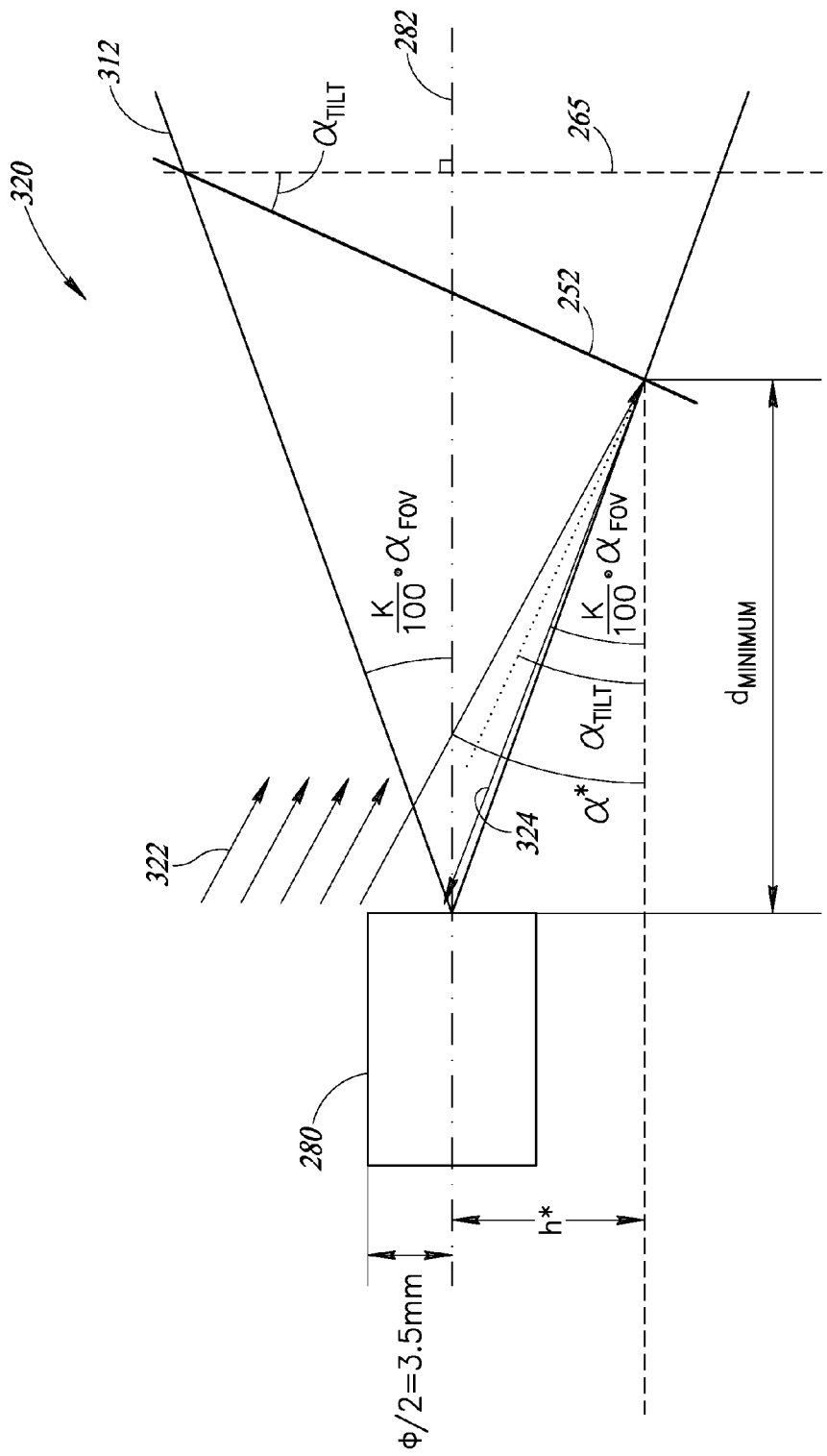
FIG. 9 is a schematic diagram of a receiving subsystem for a machine-readable symbol reader which shows estimation for the tilt of a front surface of the machine-readable symbol reader relative to a plane which is normal to the optical axis of the machine-readable symbol reader, according to one illustrated implementation.

FIG. 9 is a schematic diagram of the receiving subsystem 280 for a machine-readable symbol reader which shows estimation for the optimum tilt angle ($\alpha_{TILT}$) of a front surface (e.g., front surface 262) of the machine-readable symbol reader relative to a plane (e.g., plan 265) which is normal to the optical axis 282 of the machine-readable symbol reader, according to one illustrated implementation. Diffuse illumination may be emitted proximate to the receiving subsystem 280, and it is desirable to illuminate the object 252 which includes a machine-readable symbol with a diffusive pattern at a worst predetermined percentage (K) of the field of view of the receiving subsystem 280 at the minimum distance ($d_{MINIMUM}$).

The optimal tilt value of the marked surface, and therefore the optimal tilt value ($\alpha_{TILT}$) of the front surface 262 of the reader, may be calculated using the formula (3) below:

$$\alpha_{TILT} = \frac{\tan^{-1}\left(\tan(\alpha_{FOV} \cdot K/100) + \frac{\phi/2}{d_{MINIMUM}}\right) + (\alpha_{FOV} \cdot K/100)}{2} \quad (3)$$

where the parameter ($\emptyset$) is the diameter of the receiving subsystem 280, as shown in FIG. 9. The ideal value of the percentage (K) of the field of view may be 75%. In some implementations, the percentage (K) may be between 50% and 100%, for example.

To explain formula (3) above, the light reflection from the marked surface 252 is reflected based on the specular reflection law, which states that the direction of incoming light (the incident ray), and the direction of outgoing light reflected (the reflected ray) make the same angle with respect to the surface normal, thus the angle of incidence equals the angle of reflection. By applying such law, it is determined that the optimal tilt angle of the front surface 262 may be expressed by the formula (4) below:

$$\alpha_{TILT} = \frac{\alpha^* + \left(\frac{k}{100} \cdot \alpha_{FOV}\right)}{2} \quad (4)$$

The angle (a) may be calculated by formulas (5) and (6) below:

$$\tan\alpha^* = \frac{h^* + \frac{\phi}{2}}{d_{MINIMUM}} = \frac{\tan\left(\frac{k}{100} \cdot \alpha_{FOV}\right) \cdot d_{MINIMUM} + \frac{\phi}{2}}{d_{MINIMUM}} \quad (5)$$

$$\alpha^* = \tan^{-1}\left(\tan\left(\frac{k}{100} \cdot \alpha_{FOV}\right) + \frac{\phi}{2 \cdot d_{MINIMUM}}\right) \quad (6)$$

where the height (h*) is shown in FIG. 9. Thus, formula (6) may be used to calculate α*, and the determined term may be inserted into formula (3) to obtain the optimum value for the tilt angle ($\alpha_{TILT}$).

FIG. 10 is a schematic front elevational view of the machine-readable symbol reader 250 of FIGS. 5 and 6 showing a dark field illumination subsystem which includes a top arc-shaped row 340 of light sources (e.g., light sources 270 of FIGS. 5 and 6) and a bottom arc-shaped row 342 of light sources (e.g., light sources 270). The rows 340 and 342 may be disposed in a plane which is parallel to the tilt angle ($\alpha_{TILT}$) of the front surface 262 of the scanning head portion 256. As shown, the front surface 262 may include a top portion 330, a bottom portion 332 opposite the top portion, a first lateral portion 334 and a second lateral portion 336 opposite the first lateral portion.

Figure 11A:
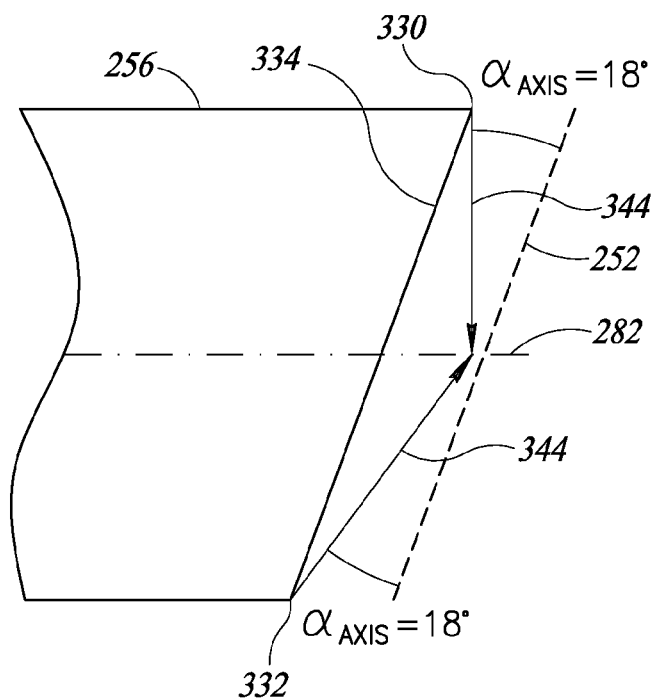
FIG. 11A is a schematic view of a scanning head portion of a machine-readable symbol reader which shows grazing incident angles for centrally located light sources of a dark field illumination subsystem, according to one illustrated implementation.

The impinging angle of the light 345 with respect to the marked surface 252 varies between a central portion or axis 344 of the top and bottom rows 340 and 342, respectively, and the marginal or external portion or axis 346 of the arc-shaped rows. Such is shown in FIGS. 11A (central axis 344) and 11B (external or marginal axis 346). The impinging angle ($\alpha_{AXIS}$) at the central axis 344 is greater than the impinging angle ($\alpha_{EXTERNAL}$) at the external axis 346. As an example, suitable impinging angles may be in the range of 15 degrees to 18 degrees (e.g., $\alpha_{EXTERNAL}$ equal to 15 degrees and $\alpha_{AXIS}$ equal to 18 degrees).

Figure 11B:
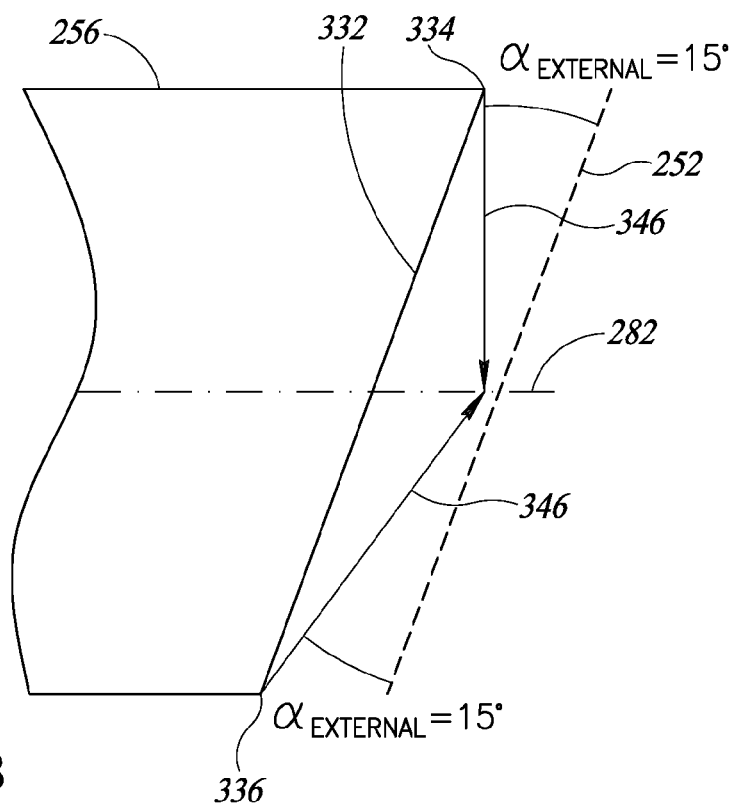
FIG. 11B is a schematic view of a scanning head portion of a machine-readable symbol reader which shows grazing incident angles for peripherally located light sources of a dark field illumination subsystem, according to one illustrated implementation.

This range of impinging angles limits the angles (θ) of the arc-shaped rows 340 and 342 of light sources, as shown in FIG. 10, by formula (7) below:

$$\theta = 90 - \sin^{-1}\left(\frac{\tan\alpha_{EXTERNAL}}{\tan\alpha_{AXIS}}\right) \quad (7)$$

where the parameters $\alpha_{AXIS}$ (e.g., 18°) and $\alpha_{EXTERNAL}$ (e.g., 15°) are shown in FIGS. 11A and 11B, respectively.

Figure 12:
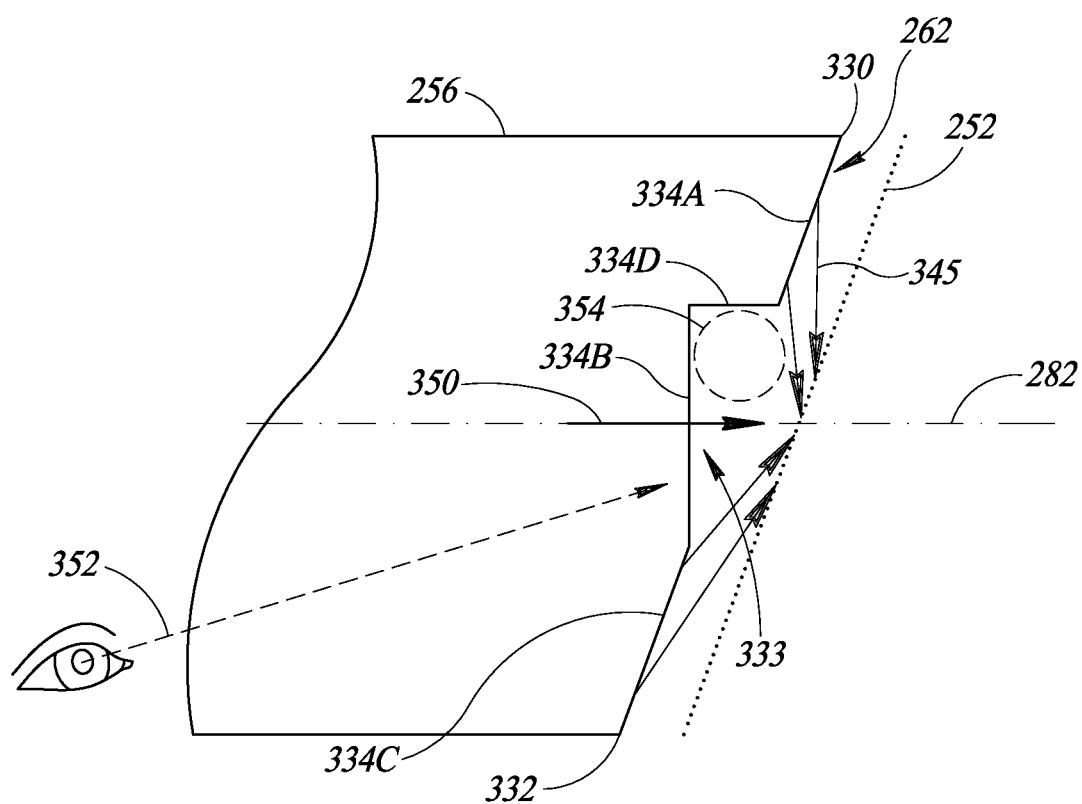
FIG. 12 is a schematic view of a scanning head portion of a machine-readable symbol reader which includes a front notch portion, according to one illustrated implementation.

FIG. 12 is a schematic view of the scanning head portion 256 of a machine-readable symbol reader which includes a front surface 262 which has a front notched portion 333 defined by recesses in the lateral portion 334 and the lateral portion 336. In the view shown in FIGS. 12 and 13, the lateral portion 334 includes a top portion 334A which is tilted at the tilt angle ($\alpha_{TILT}$), a bottom portion 334C which is also tilted at the tilt angle ($\alpha_{TILT}$), a middle portion 334B which is normal to the optical axis 282, and an horizontally extending overhang portion 334D which extends between an upper end of the middle portion 334B and a lower end of the top portion 334A.

The shape of front surface of the scanning head portion 256 provides a guide surface which is parallel to the ideal tilted plane of the marked surface 252 in the top portion 334A and the bottom portion 334C of the front end of the reader, where dark field light pattern is emitted. As discussed above, this feature helps the user orient the marked surface 252 in an ideal position with respect to the reader 250 during near field reading conditions.

Further, the notched portion 333 in the lateral portions 334 and 336 of the scanning head portion 256 create a line of sight 352 in the optical axis 282 direction, which provides at least two advantages. First, the operator may see the machine-readable symbol on the marked surface 252 and may see an optional aiming pattern 350 even when the reader is very near the surface and may consequently aim the reader at the machine-readable symbol. Additionally, the notched portion 333 provides a space to position a cylindrically-shaped marked surface 354 (or a surface having another non-planar shape) relatively closer to the receiving subsystem 280 which provides better illumination of the marked surface 354.

Figure 13:
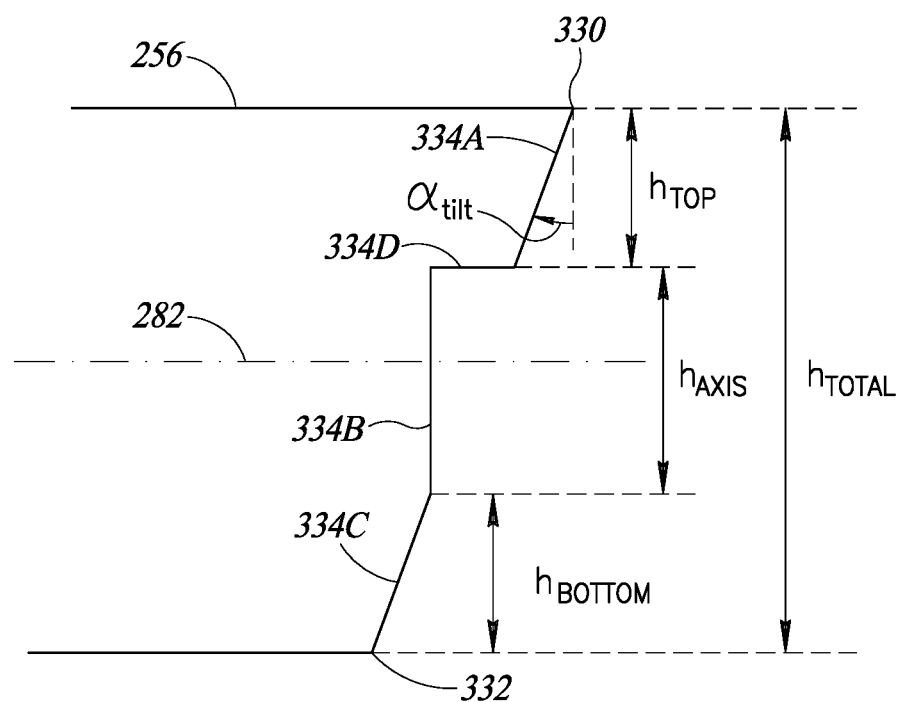
FIG. 13 is a schematic view of the scanning head portion shown in FIG. 12 showing various dimensions thereof, according to one illustrated implementation.

FIG. 13 is a schematic view of the scanning head portion 256 shown in FIG. 12 showing various dimensions thereof, according to one illustrated implementation. Formulas (8) and (9) below provide a range of exemplary values for the heights of the top portion ($h_{TOP}$), the bottom portion ($h_{BOTTOM}$) and the middle portion ($h_{AXIS}$) of the lateral portion 334.

$$h_{AXIS} = 1/3 \rightarrow 1/5 \quad (8)$$

$$h_{TOP} = h_{BOTTOM} = 1/2 \cdot (h_{TOTAL} - h_{AXIS}) \quad (9)$$

It should be appreciated that the lateral portion 336 opposite the lateral portion 334 may have similar or identical values.

Table 1 below shows the results of calculations of exemplary values considering the following parameters: $\alpha_{FOV}$=20°; $h_{MINIMUM}$=0.75 cm; $h_{MAXIMUM}$=1.5 cm; K=75% ideal case (range=50-100%); $\alpha_{AXIS}$=18°; and $\alpha_{EXTERNAL}$=15°.

TABLE 1

| K | $\alpha_{TILT}$ | $d_{MINIMUM}$-$d_{MAXIMUM}$ | θ |
|---|---|---|---|
| 75% (ideal condition) | 24° | 2-4 cm | 34° |
| 50-100% | 18°-28° | 2-4 cm | 34° |

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A machine-readable symbol reader, comprising:
   a housing which includes a scanning head portion including a front surface, the front surface includes a top portion, a bottom portion opposite the top portion, a first lateral portion which extends between the top portion and the bottom portion, and a second lateral portion opposite the first lateral portion which extends between the top portion and the bottom portion;
   a receiving subsystem disposed within the housing which captures an image of a machine-readable symbol within a field of view of the receiving subsystem, the field of view directed along an optical axis; and
   an illumination system which illuminates the machine-readable symbol while the receiving subsystem captures the image thereof, the illumination system comprising:
      a dark field illumination subsystem which in operation provides dark field illumination; and
      a diffuse field illumination subsystem which in operation provides diffuse field illumination;
   wherein at least a portion of the front surface of the scanning head portion of the housing is slanted forward at a tilt angle with respect to a plane which is normal to the optical axis, the tilt angle equal to or greater than 15 degrees and less than or equal to 30 degrees.

2. The machine-readable symbol reader of claim 1 wherein the front surface of the scanning head portion of the housing is bounded toward the front of the machine-readable symbol reader by a bounding plane which is parallel to the tilt angle.

3. The machine-readable symbol reader of claim 1 wherein the tilt angle is equal to or greater than 20 degrees and less than or equal to 25 degrees.

4. The machine-readable symbol reader of claim 1 wherein the dark field illumination subsystem provides dark field illumination at one or more grazing angles with respect to a plane which is parallel to the tilt angle, each of the one or more grazing angles is less than or equal to 30 degrees with respect to the plane which is parallel to the tilt angle.

5. The machine-readable symbol reader of claim 1 wherein the dark field illumination subsystem provides dark field illumination at one or more grazing angles with respect to a plane which is parallel to the tilt angle, each of the one or more grazing angles is less than or equal to 20 degrees with respect to the plane which is parallel to the tilt angle.

6. The machine-readable symbol reader of claim 1 wherein the dark field illumination subsystem provides dark field illumination at one or more grazing angles with respect to a plane which is parallel to the tilt angle, each of the one or more grazing angles is equal to or greater than 15 degrees and less than or equal to 20 degrees with respect to the plane which is parallel to the tilt angle.

7. The machine-readable symbol reader of claim 1 wherein the dark field illumination subsystem comprises a top row of light sources and a bottom row of light sources.

8. The machine-readable symbol reader of claim 7 wherein each of the top row and the bottom row of light sources is disposed in a plane which is parallel to the tilt angle.

9. The machine-readable symbol reader of claim 7 wherein each of the top row and the bottom row of light sources has an arc-shaped profile.

10. The machine-readable symbol reader of claim 1 wherein each of the first lateral portion and the second lateral portion comprises a notched portion which is disposed rearward of the at least a portion of the front surface of the scanning head portion of the housing that is slanted forward at the tilt angle.

11. The machine-readable symbol reader of claim 10 wherein the notched portion includes at least one portion which is normal to the optical axis.

12. The machine-readable symbol reader of claim 10 wherein the notched portion provides a line of sight to a marked surface when the marked surface is disposed adjacent the front surface of the scanning head portion of the machine-readable symbol reader.

13. A method of operating a machine-readable symbol reader, the method comprising:
   providing a machine-readable symbol reader which includes a housing having a scanning head portion including a front surface and a receiving subsystem disposed within the housing which has a field of view associated therewith which is directed along an optical axis, wherein at least a portion of the front surface of the scanning head portion of the housing is slanted forward at a tilt angle with respect to a plane which is normal to the optical axis, the tilt angle equal to or greater than 15 degrees and less than or equal to 30 degrees;
   positioning the front surface of the scanning head portion proximate a surface marked with a machine-readable symbol such that the marked surface is oriented parallel to the at least a portion of the front surface which is slanted forward at the tilt angle;

illuminating, via at least one illumination subsystem, the surface marked with the machine-readable symbol; and capturing, via the receiving subsystem, an image of the surface marked with the machine-readable symbol.

14. The method of claim 13 wherein providing a machine-readable symbol reader comprises providing a machine-readable symbol reader which includes a front surface of the scanning head portion of the housing that is bounded toward the front of the machine-readable symbol reader by a bounding plane which is parallel to the tilt angle.

15. The method of claim 13 wherein providing a machine-readable symbol reader comprises providing a machine-readable symbol reader, and the tilt angle is equal to or greater than 20 degrees and less than or equal to 25 degrees.

16. The method of claim 13 wherein illuminating the surface marked with the machine-readable symbol comprises illuminating the surface at one or more grazing angles with respect to a plane which is parallel to the tilt angle, each of the one or more grazing angles is less than or equal to 30 degrees with respect to the plane which is parallel to the tilt angle.

17. The method of claim 13 wherein illuminating the surface marked with the machine-readable symbol comprises illuminating the surface at one or more grazing angles with respect to a plane which is parallel to the tilt angle, each of the one or more grazing angles is less than or equal to 20 degrees with respect to the plane which is parallel to the tilt angle.

18. The method of claim 13 wherein illuminating the surface marked with the machine-readable symbol comprises illuminating the surface at one or more grazing angles with respect to a plane which is parallel to the tilt angle, each of the one or more grazing angles is equal to or greater than 15 degrees and less than or equal to 20 degrees with respect to the plane which is parallel to the tilt angle.

19. The method of claim 13 wherein illuminating the surface marked with the machine-readable symbol comprises illuminating the surface utilizing a top row of light sources and a bottom row of light sources.

20. The method of claim 19 wherein illuminating the surface marked with the machine-readable symbol comprises illuminating the surface utilizing a top row of light sources and a bottom row of light sources, and each of the top row and the bottom row of light sources is disposed in a plane which is parallel to the tilt angle.

21. The method of claim 19 wherein illuminating the surface marked with the machine-readable symbol comprises illuminating the surface utilizing a top row of light sources and a bottom row of light sources, and each of the top row and the bottom row of light sources has an arc-shaped profile.

22. The method of claim 13 wherein providing a machine-readable symbol reader comprises providing a machine-readable symbol reader wherein the front surface of the scanning head portion comprises a notched portion which is disposed rearward of the at least a portion of the front surface of the scanning head portion of the housing that is slanted forward at the tilt angle.

23. The method of claim 22 wherein providing a machine-readable symbol reader comprises providing a machine-readable symbol reader wherein the notched portion includes at least one portion which is normal to the optical axis.

24. The method of claim 22 wherein providing a machine-readable symbol reader comprises providing a machine-readable symbol reader wherein the notched portion provides a line of sight to a marked surface when the marked surface is disposed adjacent the front surface of the scanning head portion of the machine-readable symbol reader.

* * * * *